US012748420B2

(12) United States Patent
Okuda

(10) Patent No.: US 12,748,420 B2
(45) Date of Patent: Sep. 29, 2026

(54) SAFETY PROTECTION SYSTEM BACKUP DEVICE

(71) Applicant: Mitsubishi Electric Corporation, Tokyo (JP)

(72) Inventor: Susumu Okuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 286 days.

(21) Appl. No.: 18/720,314

(22) PCT Filed: Feb. 10, 2022

(86) PCT No.: PCT/JP2022/005280
§ 371 (c)(1),
(2) Date: Jun. 14, 2024

(87) PCT Pub. No.: WO2023/152853
PCT Pub. Date: Aug. 17, 2023

(65) Prior Publication Data
US 2025/0155887 A1 May 15, 2025

(51) Int. Cl.
*G05B 23/02* (2006.01)

(52) U.S. Cl.
CPC ................................ *G05B 23/0286* (2013.01)

(58) Field of Classification Search
None
See application file for complete search history.

(56) References Cited

U.S. PATENT DOCUMENTS

2012/0148005 A1 6/2012 Fujimoto et al.
2013/0129028 A1* 5/2013 Utsumi .................... G21D 3/04 376/217
2018/0330837 A1* 11/2018 Lee ...................... G05B 19/058

FOREIGN PATENT DOCUMENTS

JP 2012122907 A 6/2012

OTHER PUBLICATIONS

International Search Report (PCT/ISA/210) with English translation and Written Opinion (PCT/ISA/237) mailed on Apr. 5, 2022, by the Japan Patent Office as the International Searching Authority for International Application No. PCT/JP2022/005280, 8 pages.

* cited by examiner

*Primary Examiner* — Ryan A Jarrett
(74) *Attorney, Agent, or Firm* — Buchanan Ingersoll & Rooney PC

(57) ABSTRACT

This safety protection system backup device detects a state of a plant, and then, if an abnormality is found, issues an instruction to a safety-system local component according to an output of a first safety protection logic in a safety protection device and, if a common cause failure is found in the safety protection device, issues an instruction to the safety-system local component according to an output of a second safety protection logic in a CCF device. The first safety protection logic and the second safety protection logic are configured to execute digital signal processings based on logical configurations different from each other, whereby an input device and an output device can be shared by the safety protection device.

6 Claims, 5 Drawing Sheets

SAFETY PROTECTION SYSTEM BACKUP DEVICE

TECHNICAL FIELD

The present disclosure relates to a safety protection system backup device.

BACKGROUND ART

In a nuclear power plant, a reactor trip breaker is used as one device in a protection-system facility for shutting down a nuclear reactor in a case where abnormality has occurred. A control rod drive device is supplied with power from a power bus via a power converter and the reactor trip breaker, and when the reactor trip breaker is released, the control rod drive device is no longer supplied with power and a control rod is inserted in a nuclear reactor, to shut down the nuclear reactor. In addition, the protection-system facility includes safety system equipment such as pumps and valves for injecting cooling water into the nuclear reactor and urgently cooling the nuclear reactor in the case of abnormality, other than the reactor trip breaker.

The protection-system facility receives signals from various detection sensors, and, if a protection logic has determined that the nuclear reactor needs to be shut down or urgently cooled, a nuclear reactor shutdown signal is generated and an operation (release) request signal is transmitted to the reactor trip breaker or the safety system equipment.

The protection-system facility is configured so as to be multiplexed in order to achieve high reliability, but, when a common cause failure (CCF) occurs between multiplexed devices, there is a possibility that the operation (release) request signal cannot be transmitted to the reactor trip breaker and the like even in a case where abnormality has occurred in a plant.

To correctly shut down a nuclear reactor in a case where a CCF has occurred in a protection-system facility, a method of installing a CCF countermeasure facility for backing up the protection-system facility is disclosed (e.g., see Patent Document 1). The main cause of a CCF that occurs in the multiplexed protection-system facility is a software error. Therefore, the CCF countermeasure facility is an analog facility composed of electric circuit parts such as switches and relays, and, in response to a signal from a detection sensor, the CCF countermeasure facility determines whether the nuclear reactor needs to be shut down. Upon receiving a nuclear reactor shutdown signal from the CCF countermeasure facility, a power conversion device interrupts power supply to a reactor trip breaker. Thus, a control rod drive device comes to a power loss state, and a control rod is inserted into the nuclear reactor, so that the nuclear reactor is shut down.

CITATION LIST

Patent Document

Patent Document 1: Japanese Laid-Open Patent Publication No. 2012-122907

SUMMARY OF THE INVENTION

Problem to be Solved by the Invention

However, when the CCF countermeasure facility is composed of an analog facility including switches, relays, and the like as in Patent Document 1, signal input devices corresponding to the number of detectors are required. Further, signal output devices corresponding to the number of site devices in the protection-system facility are required.

In addition, a CCF device is allowed to be designed and produced such that a design grade thereof is relaxed as compared to that of the protection-system facility as a regular system facility, but, in order to prevent an electric fault in the CCF device from influencing the protection-system facility, a separation device such as a relay or a fuse for interrupting the influence of the electric fault is required to be provided between the CCF device and the protection-system facility. Therefore, the number of functions implemented in the CCF device is increased, thereby increasing the scale of the CCF device according to the number of inputs and outputs.

The present disclosure has been made to solve the above problem and an object of the present disclosure is to provide a safety protection system backup device in which the scale of a CCF device is not increased even if the number of detectors and safety-system local components is increased.

Means to Solve the Problem

A safety protection system backup device according to the present disclosure detects a state of a plant, and, if an abnormality is found, issues an instruction to a safety-system local component according to an output of a first safety protection logic in a safety protection device and, if a common cause failure is found in the safety protection device, issues an instruction to the safety-system local component according to an output of a second safety protection logic in a CCF device. The safety protection system backup device includes: a detector which detects a state of the plant; first and second analog/digital conversion circuits which are disposed in an input device of the safety protection device and perform digital conversion on an output of the detector; a first communication control circuit which is disposed in the input device and transmits to a calculation processing unit a signal outputted from the first analog/digital conversion circuit; a second communication control circuit which is disposed in the input device and transmits to the CCF device a signal outputted from the second analog/digital conversion circuit; a third communication control circuit which is disposed in a first calculation processing unit of the safety protection device, receives an output of the first communication control circuit, and transmits the output to the first safety protection logic of the calculation processing unit; a fourth communication control circuit which receives an output of the second communication control circuit and transmits the output to the second safety protection logic disposed in a second calculation processing unit of the CCF device; a fifth communication control circuit which is disposed in the first calculation processing unit and transmits an output of the first safety protection logic; a sixth communication control circuit which is disposed in the second calculation processing unit and transmits an output of the second safety protection logic; a seventh communication control circuit which receives a signal transmitted from the fifth communication control circuit and is disposed in an output device region of the safety protection device; an eighth communication control circuit which receives a signal transmitted from the sixth communication control circuit and is disposed in the output device region; a first digital/analog conversion circuit which is disposed in the output device region and performs analog conversion on a signal of the seventh communication control circuit; a second digital/ analog conversion circuit which is disposed in the output device region and performs analog conversion on a signal of the eighth communication control circuit; and a hardware circuit to which a signal of the first or second digital/analog conversion circuit is inputted and which performs output to the safety-system local component. The first safety protection logic and the second safety protection logic execute digital signal processings based on logical configurations different from each other. The first analog/digital conversion circuit and the second analog/digital conversion circuit are composed of circuits or parts different from each other. The first digital/analog conversion circuit and the second digital/analog conversion circuit are composed of circuits or parts different from each other. A communication protocol between the first communication control circuit and the third communication control circuit is different from a communication protocol between the second communication control circuit and the fourth communication control circuit. A communication protocol between the fifth communication control circuit and the seventh communication control circuit is different from a communication protocol between the sixth communication control circuit and the eighth communication control circuit.

Effect of the Invention

In the safety protection system backup device according to the present disclosure, the first safety protection logic in the safety protection device and the second safety protection logic in the CCF device are configured to respectively execute different application software, whereby the input device and the output device can be shared by the safety protection device and the CCF device, an input device and an output device exclusive to the CCF device need not be provided, and increase in the number of the detectors and the safety-system local components can also be dealt with without increasing the scale of the CCF device.

DESCRIPTION OF EMBODIMENTS

Figure 1:
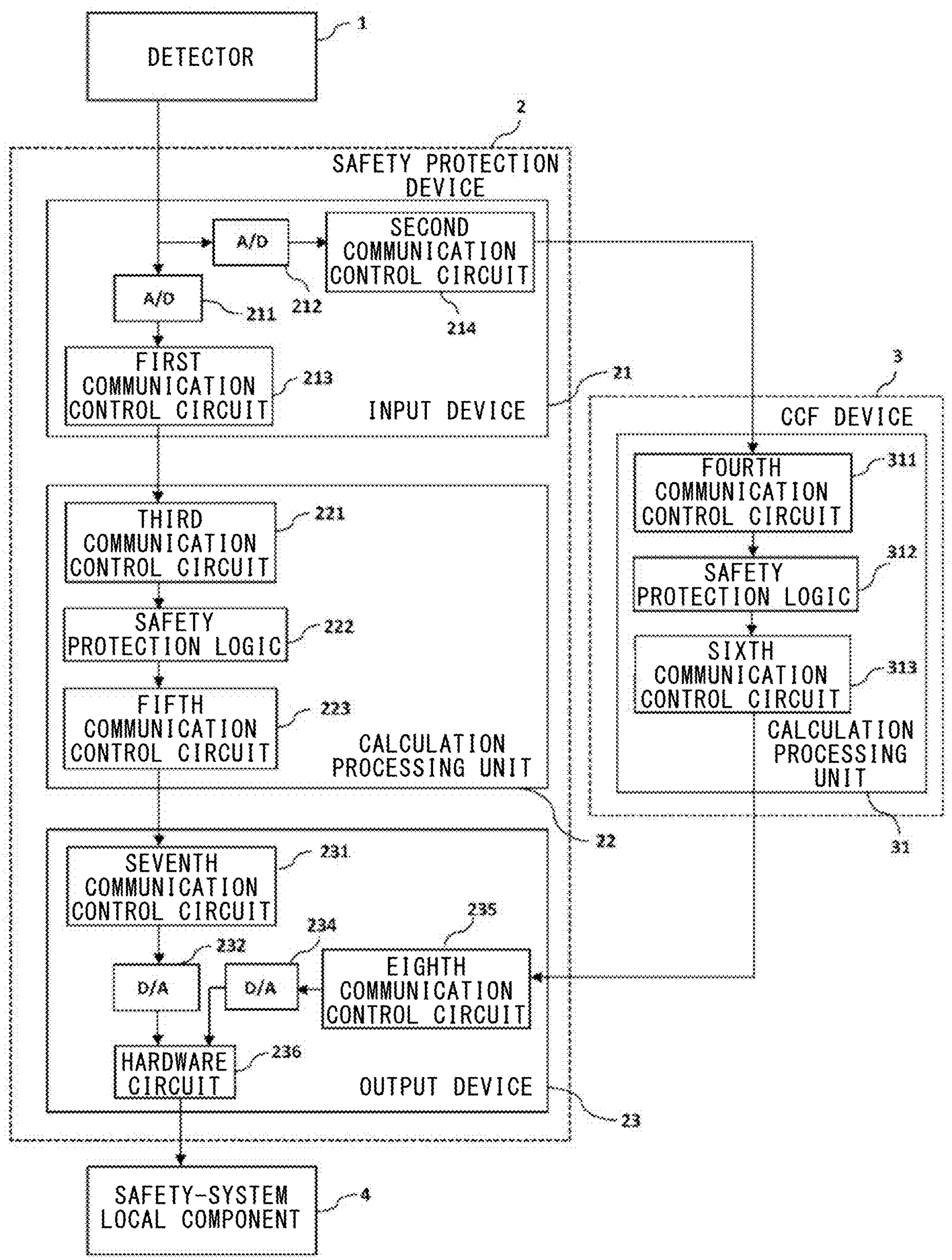
FIG. 1 is a schematic structure view of a safety protection system backup device according to embodiment 1.
Figure 2:
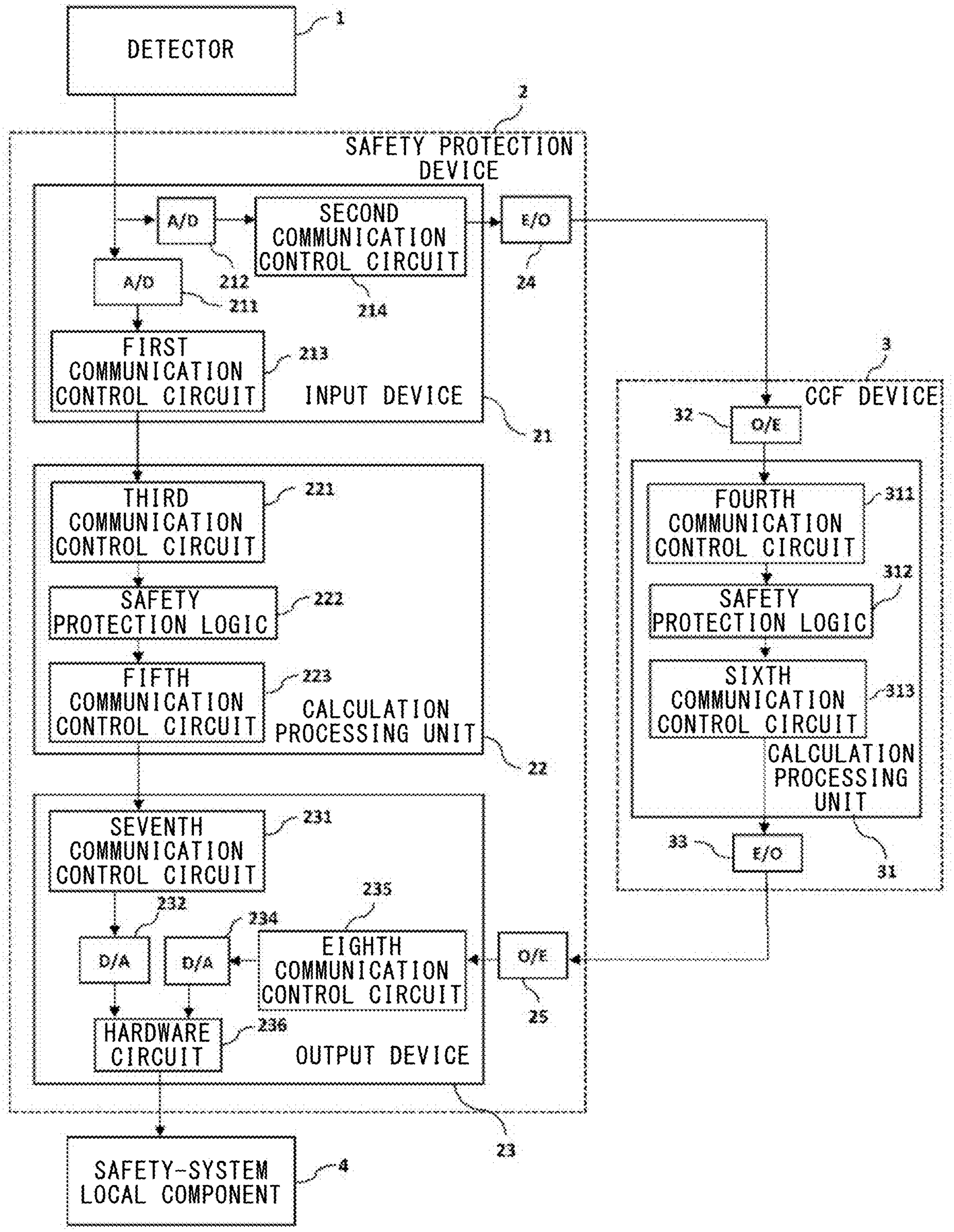
FIG. 2 is a schematic structure view of a safety protection system backup device according to embodiment 2.

Hereinafter, preferred embodiments of a safety protection system backup device according to the present disclosure will be described with reference to the drawings. The same or corresponding things and parts are denoted by the same reference characters, and the detailed description thereof is omitted. Also, in the following embodiments, components denoted by the same reference characters will not be described repeatedly.

Embodiment 1

FIG. 1 is a schematic structure view of the safety protection system backup device of the present embodiment. A case where the present embodiment is applied to a nuclear power plant will be described, but the present embodiment is not limited thereto. A detector 1 monitors the state of a nuclear power plant, and transmits a detection signal to a safety protection device 2 which is a protection-system facility. The transmitted detection signal is inputted to an input device 21 of the safety protection device 2, and is electrically distributed in the input device 21. One of the distributed signals is inputted to an analog/digital (A/D) conversion circuit 211 of the safety protection device 2 and another thereof is inputted to an A/D conversion circuit 212 for a CCF device 3.

The detection signal is converted to a digital signal by the A/D conversion circuit 211, and the digital signal is transmitted to a calculation processing unit 22 via a first communication control circuit 213 of the safety protection device 2. The transmitted digital signal is received by a third communication control circuit 221 which is an input at the calculation processing unit 22, and is used, by a safety protection logic 222 implemented as execution of a previously designed protection logic (hereinafter, referred to as application software) by a microprocessor or a FPGA, to generate an operation command signal of the protection-system facility to a safety-system local component 4. The operation command signal, generated by the safety protection logic 222, to the safety-system local component 4 is transmitted to an output device 23 via a fifth communication control circuit 223 which is an output at the calculation processing unit 22. Here, the function of application software includes four analog arithmetic operations, in addition to a logical operation.

In the output device 23, the operation command signal transmitted from the fifth communication control circuit 223 is received by a seventh communication control circuit 231 and then is converted to an analog signal by a digital/analog (D/A) conversion circuit 232, and the analog signal is transmitted to a hardware (H/W) circuit 236 which is a final output end. The H/W circuit executes priority processing on the inputted signal. Examples of the H/W circuit include an OR circuit, an AND circuit, an ON priority circuit, and an OFF priority circuit. However, the H/W circuit is not limited thereto.

On the other hand, the digital signal inputted to the A/D conversion circuit 212 is transmitted to a second communication control circuit 214 for the CCF device 3.

The A/D conversion circuit 211 and the A/D conversion circuit 212 are respectively composed of and implemented with circuits or devices (parts) different from each other. Similarly, the first communication control circuit 213 and the second communication control circuit 214 are also respectively composed of and implemented with circuits or parts different from each other.

The second communication control circuit 214 transmits the inputted digital signal to a fourth communication control circuit 311 connected to a calculation processing unit 31 of the CCF device 3 in the same manner as for the calculation processing unit 22. The transmitted digital signal is received by the fourth communication control circuit 311, and then is used, by the safety protection logic 312 configured by a microprocessor or a field-programmable gate array (FPGA) in which application software is implemented, to generate an operation request signal to the safety-system local component 4.

Here, in order to ensure diversity, the following is applied to each component:

(1) As a communication protocol between the second communication control circuit 214 and the fourth communication control circuit 311, a communication protocol different from a communication protocol to be applied between the first communication control circuit 213 and the third communication control circuit 221 is applied.

(2) The calculation processing unit 31 and the calculation processing unit 22 respectively execute similar digital signal processings by different circuits. For example, as a microprocessor of the calculation processing unit 31, a device different from a microprocessor of the calculation processing unit 22 is applied, or a FPGA is used in the calculation processing unit 31.

(3) The safety protection logic 312 and the safety protection logic 222 are respectively designed on the basis of different ideas for similar digital signal processings. For example, in a case where microprocessors are used in the calculation processing unit 31 and the calculation processing unit 22, design concepts of application software to be implemented are made different, and the microprocessors are designed by different designers so as not to make determination on the basis of the same logical configuration. In a case where a FPGA is used in the calculation processing unit 31, the FPGA is programmed by a different designer so that processing similar to the digital signal processing by the microprocessor in the calculation processing unit 22 has a logical configuration based on a different design concept.

(4) The CCF device 3 and the safety protection device 2 are designed by different designers in different departments so as to have different design concepts and provide protection on the basis of different logical configurations, respectively.

The operation request signal, generated by the safety protection logic 312, to the safety-system local component 4 is transmitted to the output device 23 of the safety protection device 2 from a sixth communication control circuit 313 which is an output at the calculation processing unit 31. The transmitted operation request signal is received by an eighth communication control circuit 235 for the CCF device 3 and then is converted to an analog signal by a D/A conversion circuit 234 for the CCF device 3, and then the analog signal is outputted to the H/W circuit 236.

The D/A conversion circuit 232 and the D/A conversion circuit 234 are respectively composed of and implemented with circuits or devices (parts) different from each other. Similarly, the seventh communication control circuit 231 and the eighth communication control circuit 235 are respectively composed of circuits or parts different from each other. Further, as a communication protocol between the sixth communication control circuit 313 and the eighth communication control circuit 235, a communication protocol different from a communication protocol between the fifth communication control circuit 223 and the seventh communication control circuit 231 is applied.

The safety protection system backup device is configured as described above, whereby the input device and the output device can be shared by the safety protection equipment and the CCF device. Thus, an input device and an output device exclusive to the CCF device need not be provided, and increase in the number of the detectors and the safety-system local components can also be dealt with without increasing the scale of the CCF device.

Embodiment 2

In the configuration of embodiment 1, a photoelectric (E/O) conversion circuit 24 which converts to an optical signal an electric signal transmitted from the second communication control circuit 214 of the safety protection device 2, and an O/E conversion circuit 32 which converts to an electric signal the optical signal received by the CCF device, are applied.

Similarly, an E/O conversion circuit 33 which converts to an optical signal an output signal of the sixth communication control circuit 313 of the CCF device 3, and an O/E conversion circuit 25 which converts to an electric signal the signal received by the safety protection device 2, are applied.

Thus, optical signals are transmitted and received between the safety protection device 2 and the CCF device 3, whereby, in a case where an electric fault or the like has occurred in the CCF device 3, the influence of the failure is prevented from spreading to the safety protection device 2. Further, since signals are transmitted through optical cables, a transmission distance can be extended as compared to a case where electric signals are used, and a constraint condition for an installation place of the CCF device 3 can be relaxed.

As described above, in the configuration of embodiment 2, the CCF device is connected to the input device and the output device through the optical cables, whereby an electric fault in the CCF device can be prevented from influencing the safety protection system, and a separation device need not be provided.

Embodiment 3

Figure 3:
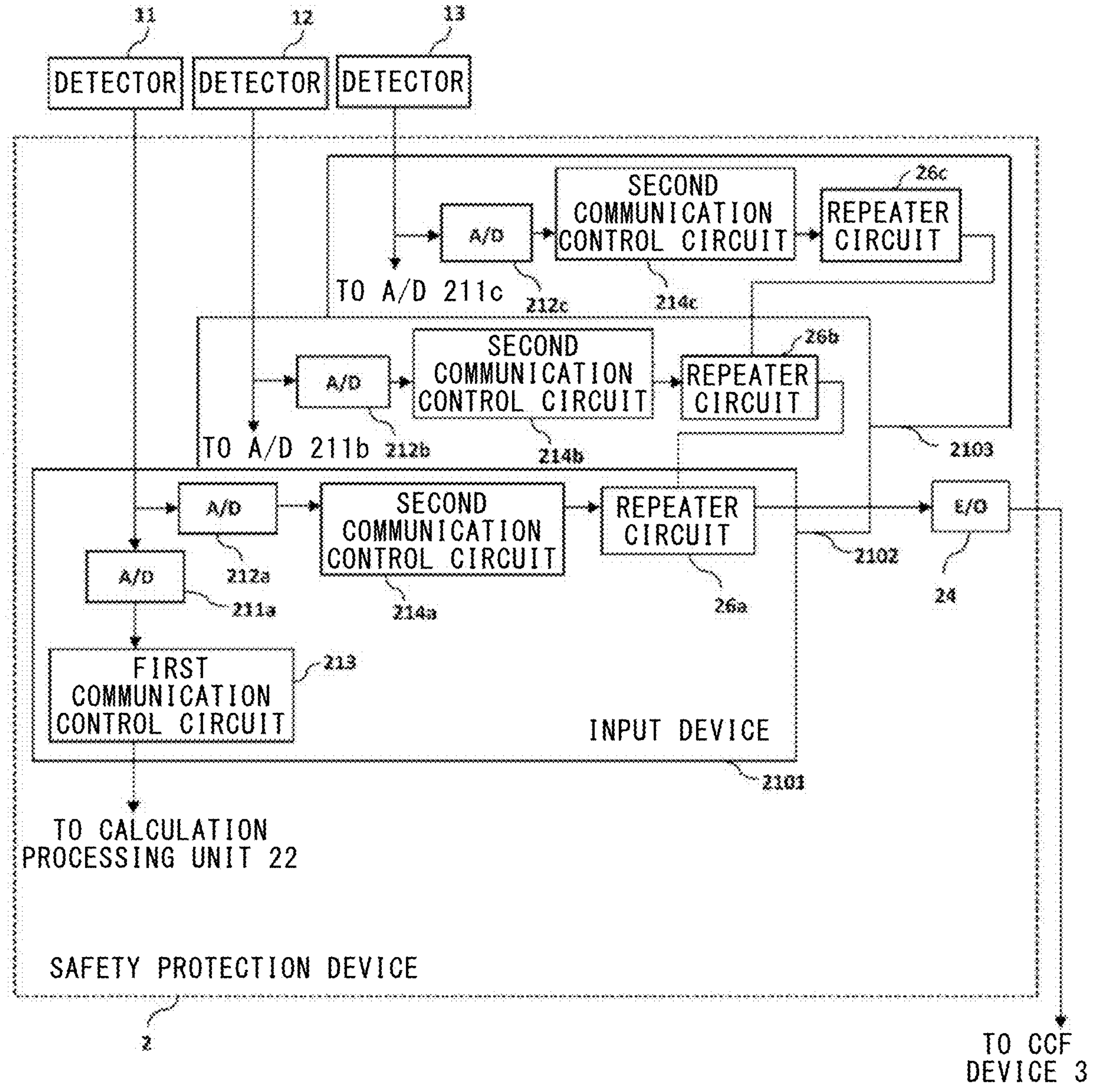
FIG. 3 is a schematic structure view of a safety protection system backup device according to embodiment 3.

As shown in FIG. 3, in the configuration of embodiment 1 or embodiment 2, detection signals from a plurality of detectors 11, 12, 13 are transmitted to the safety protection device 2 which is a protection-system facility. The transmitted detection signals are inputted to input devices 2101, 2102, 2103 of the safety protection device 2, and are electrically distributed in the input devices 2101, 2102, 2103. The signals distributed to one side are inputted to A/D conversion circuits 211*a*, 211*b*, 211*c* of the safety protection device 2 and the signals distributed to another side are inputted to A/D conversion circuits 212*a*, 212*b*, 212*c* for the CCF device 3. Outputs from the A/D conversion circuits 212*a*, 212*b*, 212*c* are inputted to repeater circuits 26*a*, 26*b*, 26*c* each having a signal aggregation function via a plurality of second communication control circuits 214*a*, 214*b*, 214*c*, respectively. The repeater circuits 26*a*, 26*b*, 26*c* are each an electrical amplification circuit including a multiplexer, a two-port memory, and the like. The amplified signals are transmitted to the CCF device 3 via an E/O conversion circuit 24. With such a configuration, the detection signals from the plurality of detectors 11, 12, 13 can be transmitted to the CCF device 3 without increasing the number of transmission lines. In the present embodiment, an example in which signals from the three detectors are inputted to the three input devices is shown, but the number of the detectors and the number of the input devices are not limited thereto.

Embodiment 4

Figure 4:
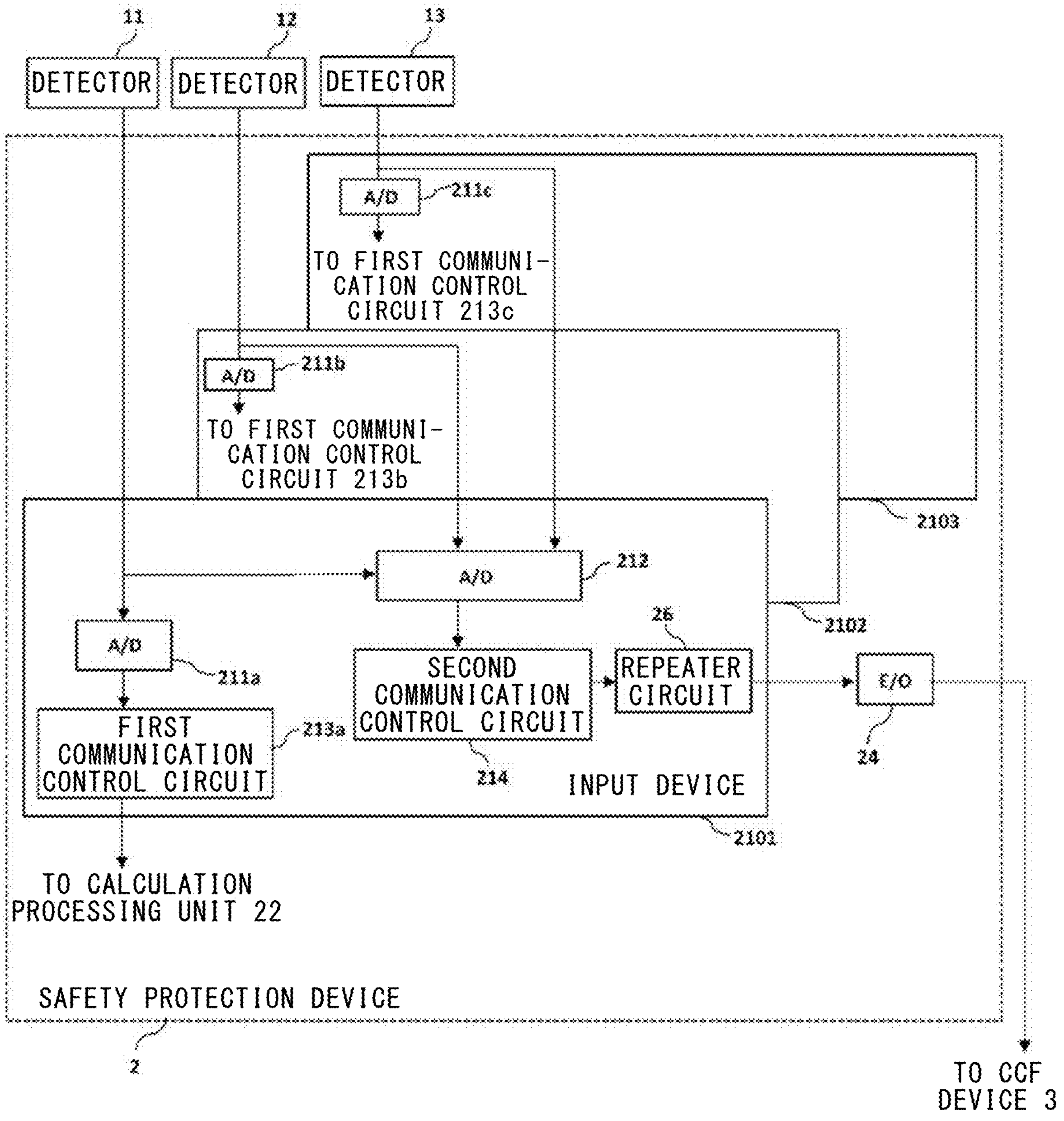
FIG. 4 is a schematic structure view of a safety protection system backup device according to embodiment 4.

As shown in FIG. 4, the detection signals transmitted from the detectors 11, 12, 13 are respectively inputted to the plurality of input devices 2101, 2102, 2103, and are electrically distributed in the input devices 2101, 2102, 2103. The signals distributed to one side are inputted to the A/D conversion circuits 211*a*, 211*b*, 211*c* of the safety protection device 2 and the signals distributed to another side are inputted to the A/D conversion circuit 212 for the CCF device 3 in one input device (e.g., input device 2101). An output from the A/D conversion circuit 212 is inputted to a repeater circuit 26 via the second communication control circuit 214. The signal amplified by the repeater circuit 26 is transmitted to the CCF device 3 via the E/O conversion circuit 24. Thus, the A/D conversion circuits for the CCF device 3 in the two input devices 2102, 2103, the second communication control circuits, and the repeater circuits are unnecessary, and the input device can be reduced in size. In the present embodiment, an example in which signals from the three detectors are inputted to the three input devices is shown, but the number of the detectors and the number of the input devices are not limited thereto. Further, in the present embodiment, an example in which the A/D conversion circuit, the second communication control circuit, and the repeater circuit disposed in one input device are shared with other input devices is shown, but only the A/D conversion circuit or the A/D conversion circuit and the second communication control circuit may be shared.

Figure 5:
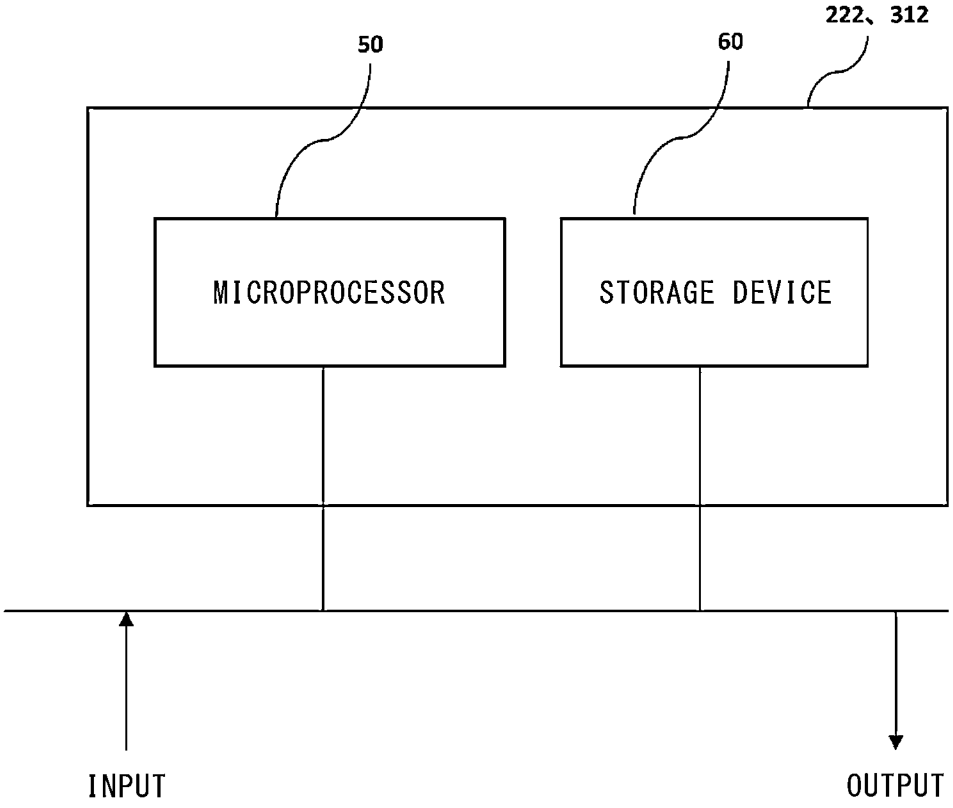
FIG. 5 is a hardware configuration diagram of a safety protection logic according to embodiments 1 to 4.

One example of hardware of the safety protection logics 222, 312 is shown in FIG. 5. As described above, the safety protection logics 222, 312 are each composed of a microprocessor 50 and a storage device 60. Although not shown, a storage device 60 includes a volatile storage device such as a random access memory, and a nonvolatile auxiliary storage device such as a flash memory. The storage device 60 may include an auxiliary storage device such as a hard disk, instead of a flash memory. The microprocessor 50 executes application software inputted from the storage device 60. In this case, the program is inputted to the microprocessor 50 via the volatile storage device from the auxiliary storage device. The microprocessor 50 may output data such as a calculation result to the volatile storage device of the storage device 60, or store such data into the auxiliary storage device via the volatile storage device. As hardware of the safety protection logic 312, a FPGA may be used instead of the microprocessor, as described above.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1, 11, 12, 13 detector
2 safety protection device
3 CCF device
4 safety-system local component
21, 2101, 2102, 2103 input device
22 calculation processing unit
23 output device
24 E/O conversion circuit
25 O/E conversion circuit
26, 26*a*, 26*b*, 26*c* repeater circuit
31 calculation processing unit
32 O/E conversion circuit
33 E/O conversion circuit
50 microprocessor
60 storage device
211, 211*a*, 211*b*, 211*c*, 212, 212*a*, 212*b*, 212*c* A/D conversion circuit
213 first communication control circuit
214, 214*a*, 214*b*, 214*c* second communication control circuit
221 third communication control circuit
222 safety protection logic
223 fifth communication control circuit
231 seventh communication control circuit
232, 234 D/A conversion circuit
235 eighth communication control circuit
236 H/W circuit
311 fourth communication control circuit
312 safety protection logic
313 sixth communication control circuit

The invention claimed is:

1. A safety protection system backup device which detects a state of a plant, and which, if an abnormality is found, issues an instruction to a safety-system local component according to an output of a first safety protection logic circuitry in a safety protection device and, if a common cause failure (CCF) is found in the safety protection device, issues an instruction to the safety-system local component according to an output of a second safety protection logic circuitry in a CCF device, the safety protection system backup device comprising:

a detector which detects a state of the plant;

first and second analog/digital conversion circuits which are disposed in an input device of the safety protection device and perform digital conversion on an output of the detector;

a first communication control circuit which is disposed in the input device and transmits to a calculation processing circuitry a signal outputted from the first analog/digital conversion circuit;

a second communication control circuit which is disposed in the input device and transmits to the CCF device a signal outputted from the second analog/digital conversion circuit;

a third communication control circuit which is disposed in a first calculation processing circuitry of the safety protection device, receives an output of the first communication control circuit, and transmits the output to the first safety protection logic circuitry of the calculation processing circuitry;

a fourth communication control circuit which receives an output of the second communication control circuit and transmits the output to the second safety protection logic circuitry disposed in a second calculation processing circuitry of the CCF device;

a fifth communication control circuit which is disposed in the first calculation processing circuitry and transmits an output of the first safety protection logic circuitry;

a sixth communication control circuit which is disposed in the second calculation processing circuitry and transmits an output of the second safety protection logic circuitry;

a seventh communication control circuit which receives a signal transmitted from the fifth communication control circuit and is disposed in an output device region of the safety protection device;

an eighth communication control circuit which receives a signal transmitted from the sixth communication control circuit and is disposed in the output device region;

a first digital/analog conversion circuit which is disposed in the output device region and performs analog conversion on a signal of the seventh communication control circuit;

a second digital/analog conversion circuit which is disposed in the output device region and performs analog conversion on a signal of the eighth communication control circuit; and a hardware circuit to which a signal of the first or second digital/analog conversion circuit is inputted and which performs output to the safety-system local component, wherein the first safety protection logic circuitry and the second safety protection logic circuitry execute digital signal processings based on logical configurations different from each other, the first analog/digital conversion circuit and the second analog/digital conversion circuit are composed of circuits or parts different from each other, the first digital/analog conversion circuit and the second digital/analog conversion circuit are composed of circuits or parts different from each other, a communication protocol between the first communication control circuit and the third communication control circuit is different from a communication protocol between the second communication control circuit and the fourth communication control circuit, and a communication protocol between the fifth communication control circuit and the seventh communication control circuit is different from a communication protocol between the sixth communication control circuit and the eighth communication control circuit.

2. The safety protection system backup device according to claim 1, wherein a first photoelectric conversion circuit is connected to a stage subsequent to the second communication control circuit, a second photoelectric conversion circuit is connected to a stage preceding the fourth communication control circuit, the first photoelectric conversion circuit and the second photoelectric conversion circuit are connected by an optical fiber cable, a third photoelectric conversion circuit is connected to a stage subsequent to the sixth communication control circuit, a fourth photoelectric conversion circuit is connected to a stage preceding the eighth communication control circuit, and the third photoelectric conversion circuit and the fourth photoelectric conversion circuit are connected by an optical fiber cable.

3. The safety protection system backup device according to claim 2, wherein in a case where outputs of a plurality of the detectors are subjected to digital conversion by a plurality of the second analog/digital conversion circuits disposed in a plurality of the input devices and then are transmitted to the CCF device via a plurality of the second communication control circuits, outputs from the plurality of second communication control circuits are transmitted via repeater circuits.

4. The safety protection system backup device according to claim 2, wherein in a case where outputs of a plurality of the detectors are inputted to a plurality of the input devices and then are transmitted to the CCF device, the outputs of the plurality of detectors are converted by the second analog/digital conversion circuit disposed in one of the input devices.

5. The safety protection system backup device according to claim 1, wherein in a case where outputs of a plurality of the detectors are subjected to digital conversion by a plurality of the second analog/digital conversion circuits disposed in a plurality of the input devices and then are transmitted to the CCF device via a plurality of the second communication control circuits, outputs from the plurality of second communication control circuits are transmitted via repeater circuits.

6. The safety protection system backup device according to claim 1, wherein in a case where outputs of a plurality of the detectors are inputted to a plurality of the input devices and then are transmitted to the CCF device, the outputs of the plurality of detectors are converted by the second analog/digital conversion circuit disposed in one of the input devices.

* * * * *